May 12, 1970     D. V. MAZZOCCO, SR     3,510,973
ILLUMINATED DISPLAY
Filed April 10, 1968     5 Sheets-Sheet 1
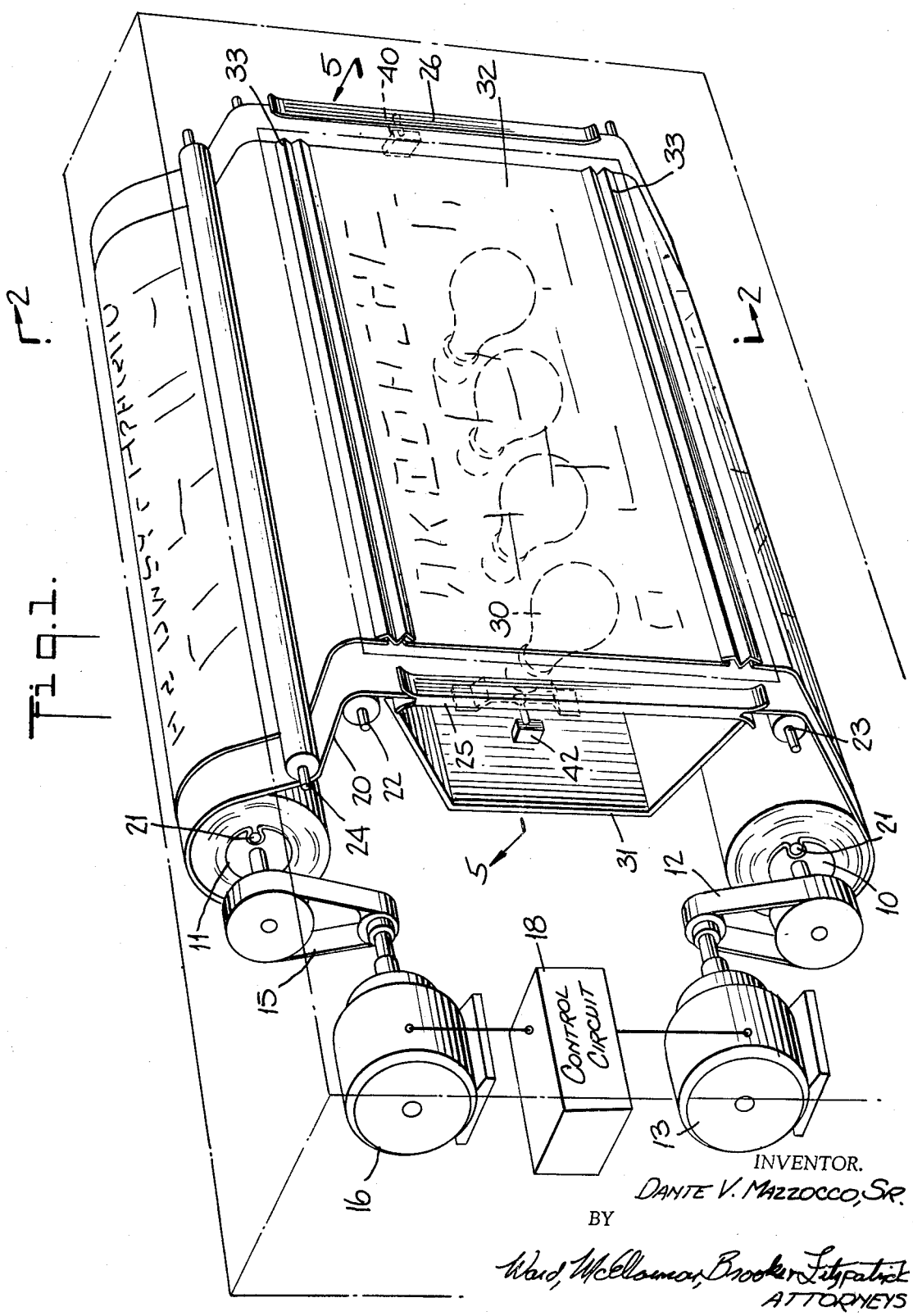
INVENTOR.
DANTE V. MAZZOCCO, SR.
BY
Ward, McElaven, Brooks Fitzpatrick
ATTORNEYS May 12, 1970  D. V. MAZZOCCO, SR  3,510,973
ILLUMINATED DISPLAY
Filed April 10, 1968  5 Sheets-Sheet 2
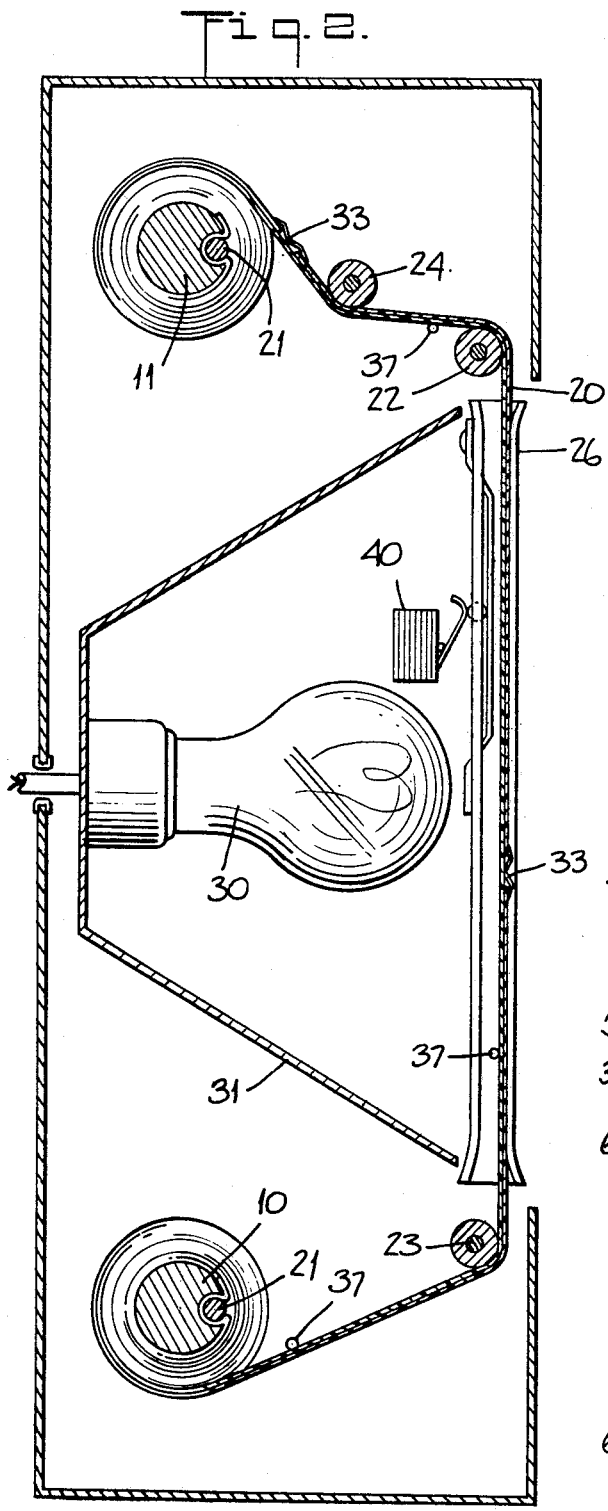
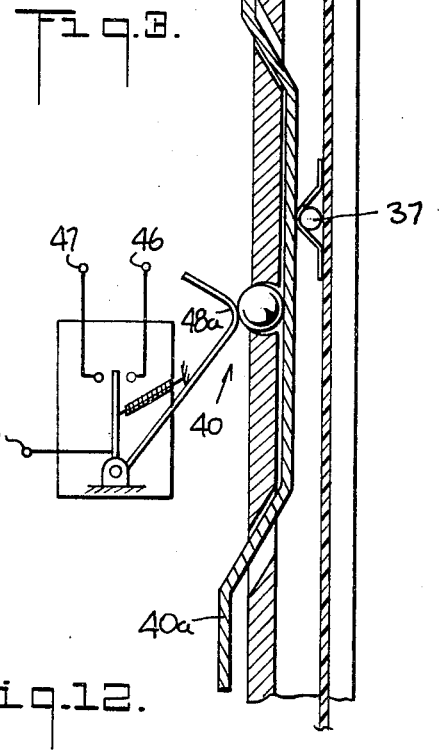
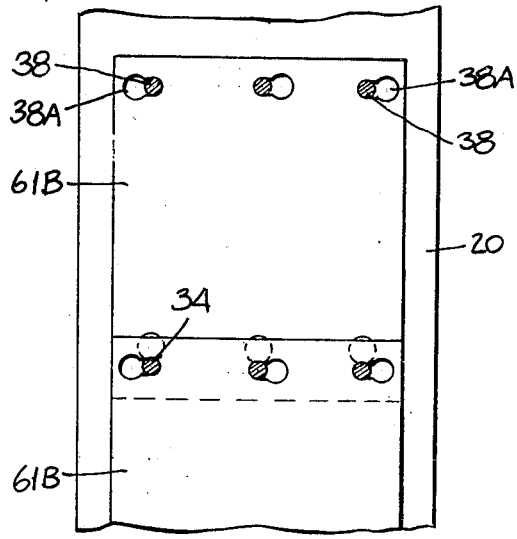
INVENTOR.
DANTE V. MAZZOCCO, SR.
BY
Ward, McElhanney, Brooks & Fitzpatrick
ATTORNEYS May 12, 1970     D. V. MAZZOCCO, SR     3,510,973
ILLUMINATED DISPLAY
Filed April 10, 1968     5 Sheets-Sheet 3
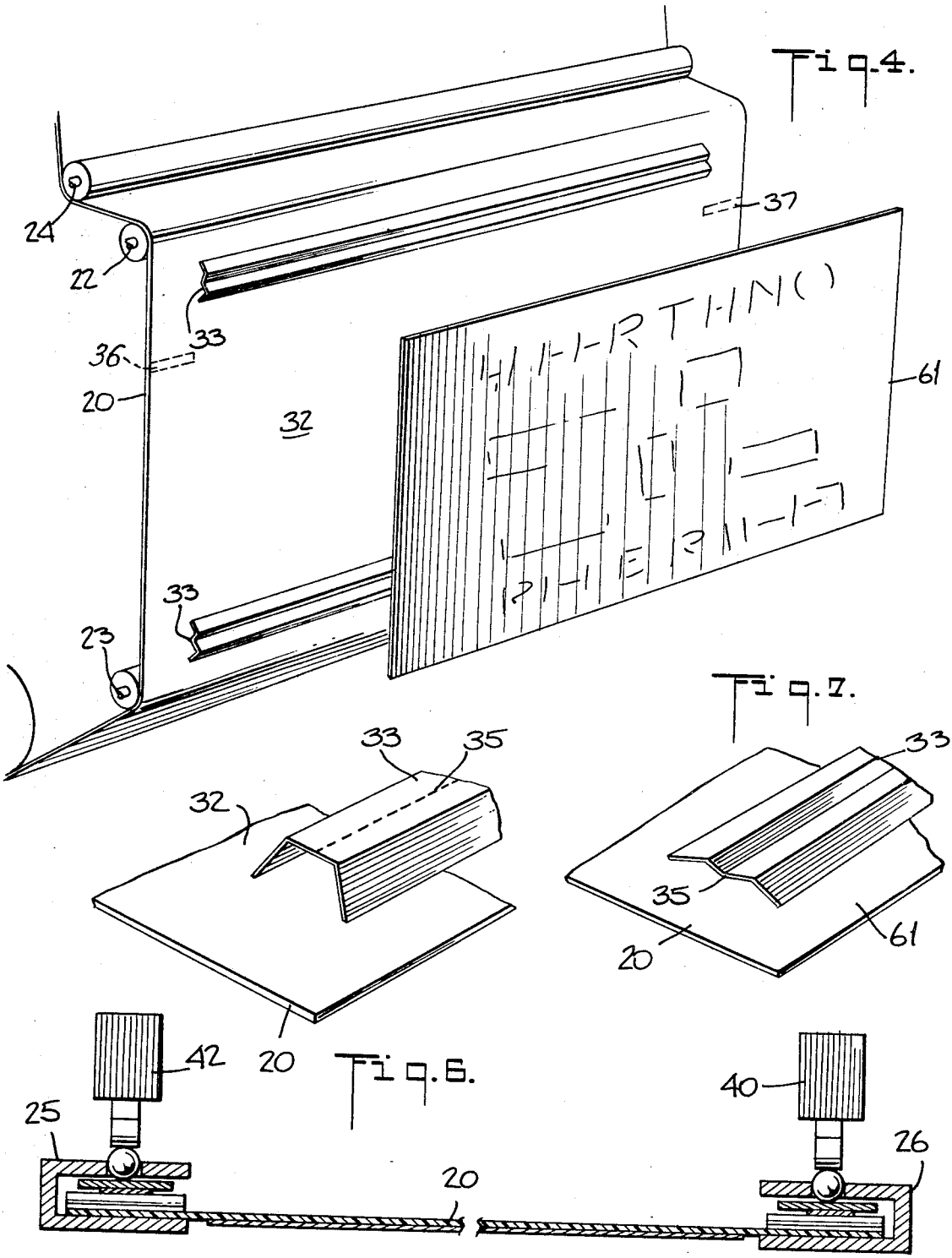
INVENTOR.
DANTE V. MAZZOCCO, SR.
BY
Ward, McElhanney Brooks + Fitzpatrick
ATTORNEYS

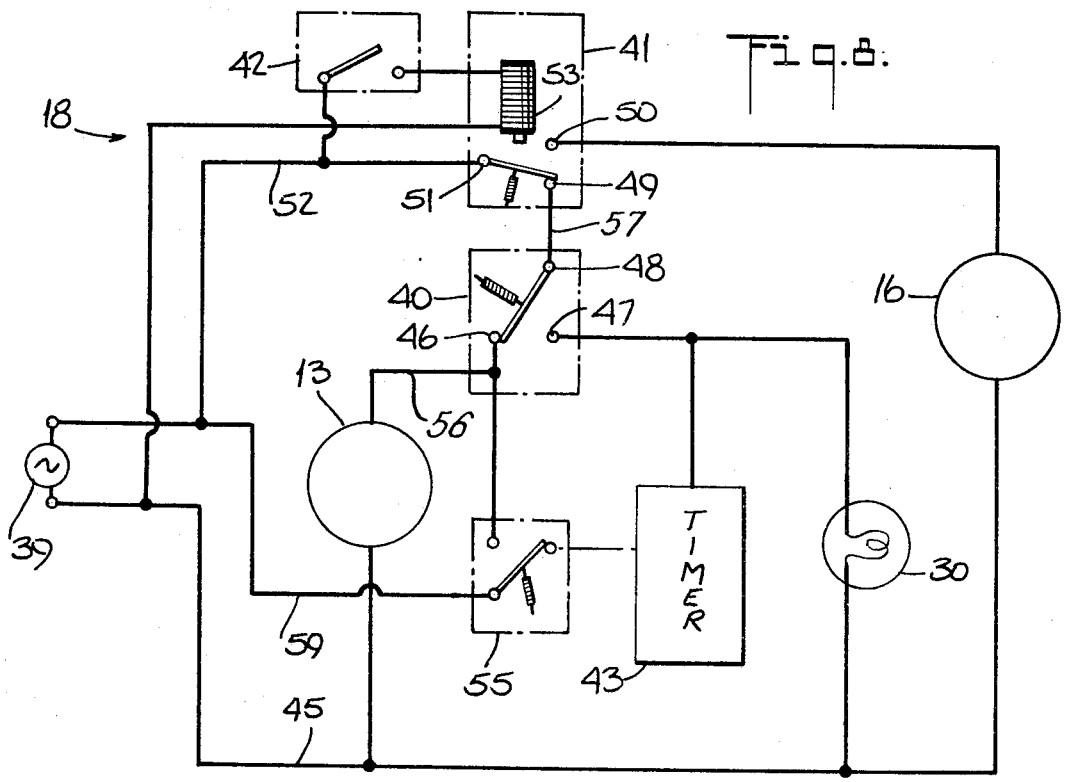
Fig. 8.
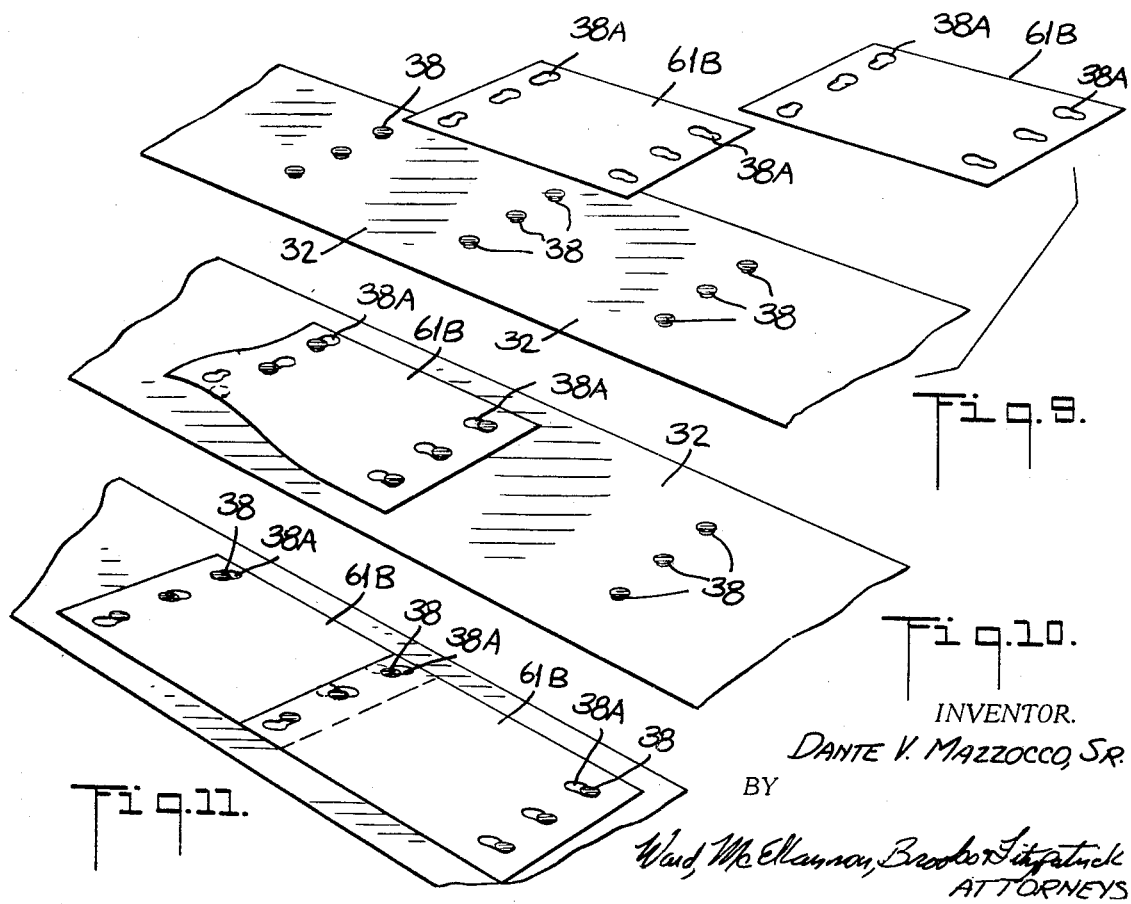
Fig. 9.
Fig. 10.
Fig. 11.
INVENTOR.
DANTE V. MAZZOCCO, SR.
BY
Ward, McElhannon, Brooks & Fitzpatrick
ATTORNEYS

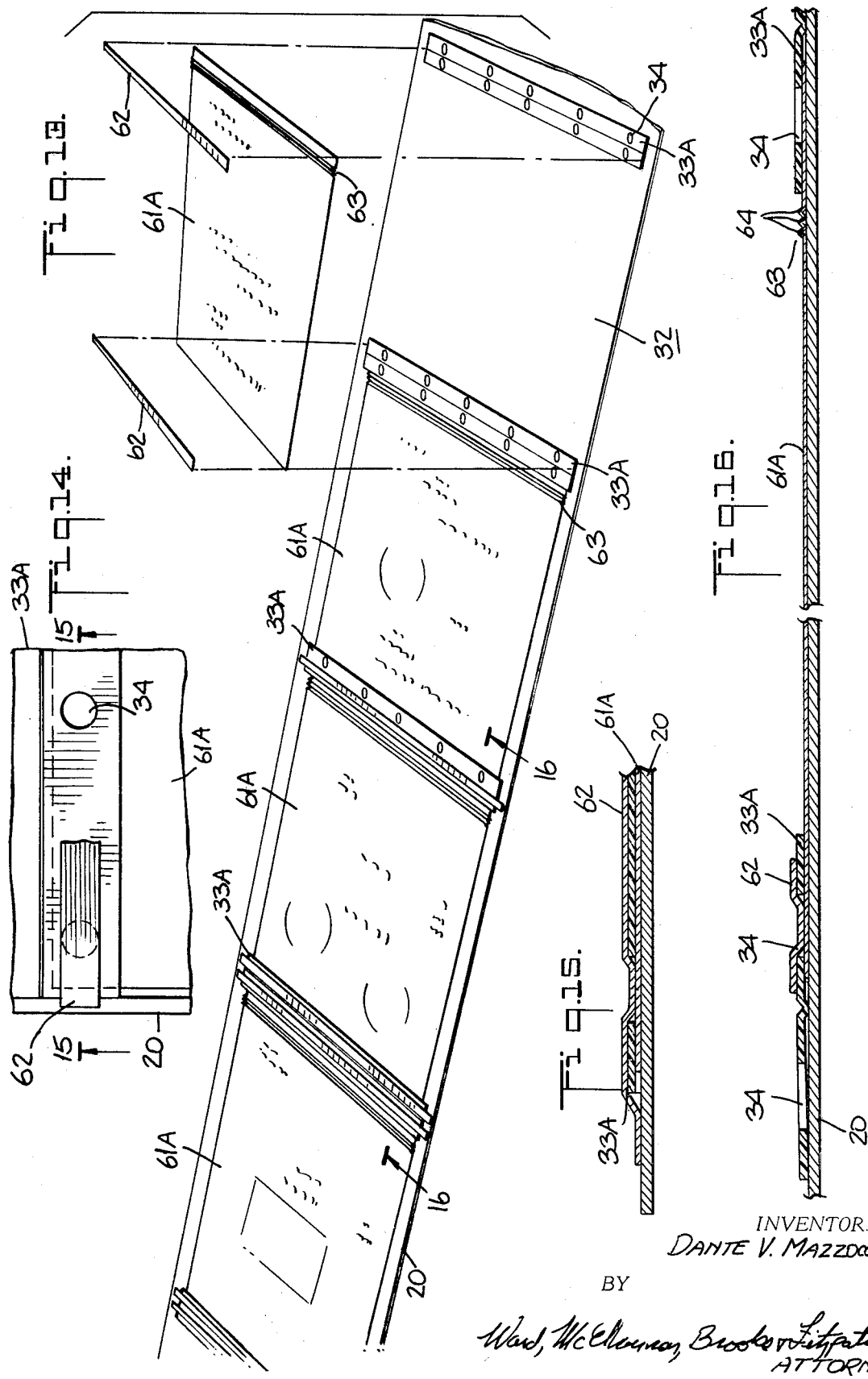

United States Patent Office 3,510,973
Patented May 12, 1970

---

3,510,973
ILLUMINATED DISPLAY
Dante V. Mazzocco, Sr., Hartsdale, N.Y., assignor to Translucent Display Corporation, New York, N.Y., a corporation of New York
Filed Apr. 10, 1968, Ser. No. 720,197
Int. Cl. G09f *11/295*
U.S. Cl. 40—31          9 Claims

ABSTRACT OF THE DISCLOSURE

Apparatus for sequentially displaying a plurality of display sheets including a housing and means therein defining a display window. A light source is positioned in the housing and aimed at the window. An elongated flexible translucent carrier web is positioned therein for longitudinal movement between the window and the light source and is moved past the display window so that different longitudinally displaced zones therealong successively become positioned in alignment therewith for predetermined durations. Means are provided on the carrier web for temporarily securing printed sheets thereto.

---

This invention relates to a display apparatus, and more particularly, to a display apparatus for sequentially displaying a plurality of sheets of printed material for the purpose of advertising, lecturing, demonstrating and the like.

Those persons skilled in the art are aware of the constant and continuing efforts in the field of display advertising to reduce the costs thereof, as well as the fact that while numerous improvements have been made over the years, a satisfactory display device which provides low cost advertising has not been brought forward.

The present invention contemplates a novel display device which substantially reduces the cost of advertising by showing many advertisments in succession, each within a relatively short interval of time. The novel display device of the present invention, moreover, permits the various advertisements to be individually removed and replaced.

One difficulty which has been encountered in connection with the use of illuminated sequential display arrangements is that of combining economy and durability. In general, a given piece of advertising literature has a relatively short life span, e.g., a few months or so. Thus, to print the literature on an expensive material, such as vinyl, would make it quite expensive to keep up with current rates of advertising turnover. On the other hand, less expensive printable material, such as paper, does not possess the strength and durability necessary for repetitive movement through a sequential display machine.

Thet present invention overcomes the above described difficulties and makes possible a high rate of display turnover with a minimum expense and without loss of strength and durability required in a sequental display machine.

According to the present invention, there is provided an elongated carrier web of durable translucent material, such as vinyl. This carrier web is driven through the display machine; however, it does not itself provide any printed display. Means are arranged along the carrier web to secure it to individual display sheets containing printed material. These display sheets may be of inexpensive and low durability paper since they are not required to perform any mechanical function other than to be held against the carrier web. The carrier web permits light to pass through it and through the display sheets, so that the visual effect is the same as if the display printing were on the vinyl carrier itself. The vinyl carrier additionally serves as a light diffusing medium which enhances the quality of illumination for the display.

In accordance with one aspect of the present invention, there is provided a display apparatus which sequentially displays a plurality of printed sheets, such as advertisements and the like. The display apparatus includes a housing, means in the housing defining a display window, and also a light source in the housing which is aimed at the display window. Guide means are provided for guiding an elongated flexible translucent carrier web for longitudinal movement between the light source and the display window. Drive means coupled to the carrier web are provided for moving the carrier web in a manner such that different longitudinally displaced zones thereof successively become positioned in alignment with the display window for predetermined duration. Additionally, means are provided on the carrier web for temporarily securing a display sheet on the window side in each of the longitudinally displaced zones.

The display apparatus is constructed to permit limited relative longitudinal movement between the display sheet and the carrier web. The display sheet may be provided with crimped portions extending parallel to the means for securing the display sheet to the carrier web; the crimped portions allow expansion of the display sheet to provide the relative movement between the display sheet and the carrier web. Alternatively, the means for securing the display sheets to the carrier may be constructed to allow the desired longitudinal movement. This may be accomplished by securing a resiliently flexible pressure member to the carrier web along the edges of the zones and arranged to extend a short distance into the zones. In another embodiment, a plurality of grooved tabs may be provided along the edge of the zone to engage a display sheet provided with special tab engaging slots. These described arrangements have the desirable feature that the advertisements or the like to be displayed may be printed or otherwise made on paper, a relatively inexpensive material, and thus may be readily changed as often as desired at slight expense.

In accordance with another aspect of the present invention, reversing pins are positioned at each end of the carrier web and sequential indexing pins are positioned near each of the display zones. The carrier web is transported by forward and reverse rollers, each being driven by a single directional motor. Circuit means are also provided for actuating the forward and reverse roller motors. The circuit means is biased so as to maintain the forward roller motor activated in order that the carrier web is unwound from the reverse roller to the forward roller. Switching means, responsive to the mentioned sequential indexing pins, are provided for intermittently disengaging the drive of the forward roller so that each of the display zones becomes aligned in the display window for a predetermined period of time. Reversing switching means, responsive to the mentioned reversing pins, are also provided for simultaneously disengaging the drive of the forward roller and engaging the reverse roller to rewind the reverse roller when it has become completely unwound. This arrangement has the desirable feature in that neither expensive reversible motors nor complicated clutch structure is necessary to carry out the desired continuously repetitive sequential display.

In accordance with still another aspect of the present invention, a novel display sheet is provided which is especially suitable to be temporarily secured to a carrier web having the mentioned grooved tabs defining the display zone. The display sheet is provided with a plurality of slots at opposite ends thereof for engaging the tabs in the carrier web, the slots at one end being elongated in the direction of carrier web movement and the slots at the other end being elongated in a direction perpendicular to the carrier web movement.

There have thus been outlined rather broadly the more important features of the invention in order that the detailed description thereof that follows may be better understood, and in order that the present contribution to the art may be better appreciated. There are, of course, additional features of the invention that will be described hereinafter and which will form the subject of the claims appended hereto. Those skilled in the art will appreciate that the conception upon which this disclosure is based may readily be utilized as a basis for the designing of other structures for carrying out the several aspects of the invention. It is important, therefore, that the claims be regarded as including such equivalent constructions as do not depart from the spirit and scope of the invention.

Certain specific applications of the invention have been chosen for purposes of illustration and description, and are shown in the accompanying drawings forming a part of the specification wherein:

FIG. 1 is a perspective view of the overall assembly of the display apparatus in accordance with the present invention;

FIG. 2 is a side view of the display apparatus of FIG. 1 taken along line 2—2;

FIG. 3 is an enlarged fragmentary view showing the cooperation of the carrier web and the switching actuation means of the present invention;

FIG. 4 is a perspective view showing the manner of securing the display sheets of printed material to the carrier web;

FIG. 5 is a fragmentary top view of FIG. 1 taken along lines 5—5;

FIG. 6 shows the positioning of the display fastening strips during one phase of its attachment to the carrier web;

FIG. 7 shows the paper fastening strip of FIG. 6 as completely assembled, and temporarily holding a display sheet;

FIG. 8 is a circuit diagram of a suitable electric circuit for actuating the display device of the present invention;

FIG. 9 shows a carrier web and specially adapted display sheets therefor in accordance with an alternative embodiment of the present invention;

FIG. 10 shows the relative positioning of the display fastening means and display sheets of the embodiment shown in FIG. 9, during a first phase of securing the display sheets to the carrier web;

FIG. 11 shows the final relative positions of the display sheets and carrier web in accordance with the embodiment of FIG. 9;

FIG. 12 is an enlarged fragmentary view showing the final relative positions of the display sheets and carrier web of the embodiment of FIG. 9;

FIG. 13 shows a carrier web and specially adapted display sheets therefor in accordance with still another alternative embodiment of the present invention;

FIG. 14 is an enlarged fragmentary view showing the display fastening means utilized in the embodiment shown in FIG. 13;

FIG. 15 is a section view taken along line 15—15 of FIG. 14; and

FIG. 16 is a section view taken along line 16—16 of FIG. 13.

Referring now to the drawings in detail, and specifically to FIGS. 1 and 2, two belt rollers are shown, a forward roller 10 and a reverse roller 11. Forward roller 10 is driven through a suitable mechanical linkage 12 by a forward drive single directional motor 13 which preferably rotates at a speed of approximately 60 revolutions per minute. The reverse roller 11 is driven through suitable mechanical linkage 15 by a reverse drive single directional motor 16 which preferably rotates at a speed of 90 revolutions per minute. The forward and reverse drive single directional motors 13 and 16 are actuated and controlled by a control circuit 18 in a manner to be more fully described hereinafter.

An elongated flexible carrier web 20, preferably translucent vinyl, is affixed at its respective ends to the forward roller 10 and to the reverse roller 11 by means of a spring clamp 21. The carrier web 20 extends between the mentioned forward roller 10 and reverse roller 11 by means of guide rollers 22 and 23 and tension roller 24. The guide rollers 22 and 23 have their longitudinal axes in the same plane and function to define a viewing plane for the carrier web 20 as well as to facilitate the unwinding of the same from the mentioned forward and reverse rollers. The tension roller 24, on the other hand, is biased by means (not shown) against the carrier web 20 to maintain it taut during its movement through the device. Guide channels 25 and 26 are provided between the guide rollers 22 and 23 at the longitudinal edges of the carrier web 20 to provide additional support for the translation of the carrier web 20. The channels 25 and 26 also serve to house a reversing switch 42 and sequence switch 40. The function of these last mentioned switches will be described more fully hereinafter. As shown in FIG. 2, suitable illumination means, such as a bank of electrical light bulbs 30, is provided behind and intermediate the guide rollers 22 and 23. A suitable reflector housing 31 is provided behind the bulbs 30.

As shown in FIG. 4, the carrier web 20 is divided into a plurality of display zones 32 arranged in series along its length. Each display zone 32 is adaptable to temporarily receive therein at least one display sheet 61. The display zones 32 are defined by a plurality of display fastening strips 33, each preferably positioned perpendicular to the plane in which the carrier web 20 moves. The display fastening strips 33 may be of vinyl or similar resilient material; and they are initially precreased to an inverted trough shape as shown in FIG. 6. The strips 33 are secured along a central portion 35 thereof to the carrier web 20 as shown in FIG. 7. Each strip thus provides a pair of transversely extending edges resiliently biased against the carrier web 20. One edge may engage and secure one end of a display sheet 61 (FIG. 4) in one of the display zones 32 while the other edge may simultaneously engage and secure another end of an adjacent sheet. In the embodiment shown in FIG. 4, the display fastening strips 33 are constructed of a resilient material which is rigid enough to secure the display sheets 61 to the carrier belt 20 but which is resilient enough to allow limited display sheet movement. This arrangement provides limited relative longitudinal movement between the display sheets and the carrier web.

Turning now to FIGS. 13–16, there is shown an alternative arrangement for fastening display sheets to the carrier web 20. In this arrangement, display fastening strips 33A are utilized to define the display zones 32. Display fastening strips 33A are constructed and positioned on the carrier web 20 in substantially the same manner as fastening strips 33 described above, but additionally have a plurality of apertures 34 defined therein (FIGS. 13 and 14). As shown in FIGS. 15 and 16, the apertures 34 are arranged to provide openings from the top surface of the display fastening means 33A to the display sheets 61A positioned thereunder. The apertures are sized to permit adhesive means, such as adhesive tape 62 shown in FIG. 14, to depend from the top surfaces of the display fastening means 33A and engage the display sheets 61A thereunder. This arrangement prevents relative movement between the fastening strips 33A and the display sheets 61A.

In order to permit limited longitudinal movement between the carrier web 20 and the display sheets 61A, the display sheets 61A are provided with crimped portions 63 (FIG. 16) which extend parallel to fastening strips 33A and which are preferably located close to one edge of the display zone 32 (FIG. 13). As shown in FIG. 16, the crimped portion 63 may be defined by a plurality of pleats 64 which allow the display sheet 61A to expand when subject to limited longitudinal stresses and thus allow limited longitudinal movement between the display sheet 61A and the carrier belt 20.

Alternatively, as shown in FIGS. 9–12, the display zones 32 may be defined by a plurality of button-like display sheet engaging tabs 38, preferably arranged in lines extending across the web 20. In this case, the display sheets are specially constructed to engage the tabs 38. As shown in FIG. 9, printed display sheets 61B are each provided along its opposite ends with a plurality of key shaped tab engaging slots 38A. The slots along the top edge of each sheet 61B extend in a direction crossways of the sheet, while the slots along the bottom edge of the sheet 61B extend lengthwise of the sheet. As shown in FIG. 10, in order to lock the display sheets 61B to the carrier web 20, the enlarged ends of the slots 38A are passed over the tabs 38 and the sheets 61B is shifted laterally to secure the narrow portion of each slot under its associated tab. Each line of tabs secures the crosswise extending slots of one diplay sheet and the lengthwise extending slots of the adjacent sheet. It will be appreciated that all of the display sheet securing arrangements described herein provide convenience in the securing and replacement of individual sheets. In addition, they allow for the relative longitudinal displacement which occurs between the carrier and the sheets as the sheets and carrier are wound on to and off from the rolls 10 and 11.

As shown in FIGS. 2, 3, and 4, the carrier web 20 has disposed therealong reversing pins 36 and sequential indexing pins 37. In the illustrative embodiment, the reversing pins 36 are positioned on one longitudinal side of the carrier web 20 at both ends thereof near their juncture to the forward roller 10 and reverse roller 11, respectively, while the sequential indexing pins 37 are positioned on the other longitudinal side of the sheet and in each of the above mentioned display zones 32. The function of the reversing pins 36 and of the sequential indexing pins 37 will be described in the description of the overall operation of the display device.

The control circuit 18 for operating the motors 13 and 16 is shown in FIG. 8. The circuit includes an electrical energizing source 39, which may be, for example, that which provides normal 110 volt, 60 cycle household power. There is also provided a monostable sequential switch 40, a monostable reversing relay switch 41, a bistable reversing switch 42, a timer 43, and a circuit connection to the illumination means 30, mentioned above. The energizing source 39 is connected via a connection 45 to one terminal of the forward drive motor 13 and of the reverse drive motor 16. As shown in FIGS. 3 and 8, the other terminal of the forward drive motor 13 is connected to a contact 46 of the sequential switch 40, while the timer 43 and the illumination means 30 are connected to another contact 47 of the sequential switch 40. The switch 40 also has a common contact 48 which is connected to a contact 49 on the reversing relay switch 41. The other terminal of the reverse drive motor 16 is connected to another contact 50 of the switch 41. The switch 41 also has a common contact 51 which is connected via a connection 52 to the energizing source 39. The reversing relay switch 41 is mechanically actuated by the plunger of a solenoid 53; and this in turn is energized when the reversing switch 42 is connected between the connections 45 and 52 from the energizing source 39. A monostable switch 55 is connected by means of a connection 59 between the contact 46 of the sequential switch 40 and the energizing source 39. The monostable switch 55 is mechanically actuated by the timer 43. The timer 43 may comprise any electronic or mechanical means which will perform the function to be described hereinafter.

The control circuit 18, as herein described, functions to sequentially control the motors 13 and 16 which, as previously noted, drive the forward roller 10 and the reverse roller 11, at proper times and in proper amounts so that the carrier web 20 is moved first in the forward direction intermittently to bring each of the display zones sequentially into alignment with the viewing area for given viewing durations, and following this the entire carrier web is reversely driven rapidly over its entire length to its initial position.

The control circuit 18 is quiescently biased so as to maintain the motor 13, which drives the forward roller 10, in its activated condition. Thus, as shown in FIG. 8, the forward drive single directional motor 13 is connected to the energizing source 39 through the connection 45 and returned to the same through the connection 56, common contact 48, the connection 57, the common contact 51 of the reversing relay switch 41, and then finally through the connection 52 to the energizing source 39. This described quiescent connection permits the single directional motor 13 to unwind the carrier web 20 from the reverse roller 11 to the forward roller 10 at the rate of 60 revolutions per minute.

As shown in FIGS. 2 and 3, while the carrier web 20 passes in the viewing area described above, the sequential indexing pins 37, positioned in each of the display zones 32, sequentially actuate the monostable sequencing switch 40 so as to disconnect the common contact 48 from the contact 46 and to connect the same to the contact 47. These sequential indexing pins 37 function to intermittently stop the carrier web 20 so that each of the display zones 32 positioned thereon are displayed in the viewing zone for a predetermined period of time. It will be noted that sequencing switch 40 is actuated by a rather long lever arm 48a which is connected in an off centered manner to the lever element 48a of the common contact 48. This arrangement has been found to provide security from accidental tripping of the switch 40 by means other than the sequential indexing pins 37.

Thus, as shown in FIG. 3, sequencing indexing pins 37 disconnect the forward drive motor 13 from the energizing source 39 and connect the energizing source 39 to both the timer 43 and the illumination means 30, the latter illuminating the display zones 32 through the translucent carrier web 20. The timer 43 is mechanically coupled to the monostable switch 55 to momentarily close the same at the end of the mentioned predetermined period so as to momentarily connect the motor 13 to the energizing source 39 through the connection 59. The timer 43 may comprise any known delay actuated monostable multivibrator or any known mechanical time actuator such as a motor control switch. All that is necessary for the performance of the timer 43 is the production of some type of mechanical control to momentarily close the contacts of the switch 55 at the end of the mentioned predetermined time. In the preferred embodiment, this predetermined period is 15 seconds. Thus, it may be seen that as the carrier web 20 is progressively unwound from the reverse roller 11 to the forward roller 10, the sequential indexing pins 37 sequentially stop its motion for a predetermined time, for example 15 seconds, displays one of its display zones 32, and turns on the illumination means 30 so as to illuminate the same.

This sequence is repeated until the carrier web 20 is almost completely unwound from the reverse roller 11. At this point, the reversing pin 36, positioned at that end, closes the bistable reversing switch 42 and thereby actuates the solenoid 53 to disconnect the common contact 51 of the reversing relay switch 41 from the contact 49 and position it at the contact 50. Reversing switch 42 may take a form similar to the sequential switch 40 shown in FIG. 3 but without the illustrated monostable biasing. This described switching disconnects the energizing source 39 from the motor 13 driving the forward roller 10 and applies the same to the motor 16 driving the reverse roller 11. This allows the carrier web 20 to rewind at 90 revolutions per minute about the reverse roller 11 until the reversing pin 36 positioned at the unwound end trips the bistable reversing switch 42 and opens its contact. This allows the release of the monostable reversing relay switch 41 and the reapplication of the energizing voltage 39 to the motor 13 from the motor 16.

In the operation of the above described display apparatus, sheets of printed material for use in advertising, lecturing, demonstrating and the like are positioned in the display zones 32 of the carrier web 20 and are temporarily secured thereto by the paper fastening means 33, 33A and 34. During its operation, the carrier web 20 is passed through the viewing zone defined by the guide rollers 22 and 23 in a continuously repetitive sequence. As each of the display sheets passes through the viewing zone, the carrier web 20 is stopped and the illumination means 30 turned on so that each of the printed sheets is illuminated through the translucent backing of the carrier web 20 and displayed in the display zone for a predetermined period of time. When the last printed sheet positioned on the carrier web 20 has been displayed, the carrier web 20 is rewound on the reverse roller 11 until the carrier web 20 is completely rewound on the reverse roller 11, and then the process is repeated.

Thus, it may be seen from the above that the present invention provides a novel display device which substantially reduces the cost of advertising by showing many advertisements in succession, each within a relatively short interval of time, and which is adaptable to have each of these advertisements removed and replaced with another.

What is claimed as new and novel is:

1. Apparatus for sequentially displaying a plurality of printed sheets, said apparatus comprising a housing, means in said housing defining a display window, a light source in said housing aimed at said display window, an elongated flexible translucent carrier web, forward and reverse rollers positioned in said housing for engaging and passing said carrier web for movement between said light source and said display window in a direction substantially normal to the path of light through said display window, said rollers adapted for movement in response to operation of one of a pair of uni-directional motors controlled by an hereinafter defined reversing means, first means including reversing means positioned on said carrier web at opposite ends thereof coupled to said forward and reverse rollers and a pair of uni-directional motors for separately driving said rollers in response to said reversing means and in a manner such that different longitudinally displaced zones of said carrier web sucessively become positioned in alignment with said window, second means on said carrier web for temporarily securing a printed sheet on the window side thereof in each of said longitudinally displaced zones and for permitting limited relative longitudinal movement between the printed sheet and the carrier web, and third means including sequential indexing means positioned on said carrier web within each displaced zone and coupled to said first means for intermittently stopping said carrier web for predetermined durations when said displaced zones become aligned with said window.

2. The apparatus as in claim 1 wherein said second means includes a resiliently flexible pressure member secured to said carrier web along the edge of the zones and arranged to extend a short distance into the displaced zones.

3. The apparatus as in claim 1 wherein said second means is arranged to simultaneously extend into two adjacent displaced zones whereby said second means secures the top portion of one printed sheet and the bottom portion of the next printed sheet to be displayed.

4. The apparatus as in claim 3 wherein said second means is a precreased vinyl strip arranged perpendicularly to the direction of carrier web movement.

5. The apparatus as in claim 1 wherein said second means includes a plurality of grooved tabs.

6. The display apparatus as in claim 1 wherein said first means further includes reversing relay means responsive to the movement of one of said reversing means to a given position for deenergizing one of said motors and energizing the other motor, and further responsive to the movement of the other of said reversing means to said given position for energizing said one motor and deenergizing the other motor.

7. The display apparatus as in claim 1 wherein said third means further includes sequential switch means responsive to the movement of each sequential indexing means past a given point for temporarily deenergizing the actuating motor of the forward roller.

8. The apparatus as in claim 1 wherein said second means includes a resiliently flexible pressure member secured to said carrier web along the edge of the zones and having a portion thereof extending a short distance into the displaced zones, said portion having means defining a plurality of apertures disposed therealong for permitting the adherence of printed sheets to said first means.

9. The apparatus as in claim 8 wherein said means defining a plurality of apertures is arranged in a substantially straight line and adapted to accept adhesive tape positioned along said line.

References Cited

UNITED STATES PATENTS

| | | | |
|---|---|---|---|
| 1,740,517 | 12/1929 | Margeson | 40—31 |
| 2,419,802 | 4/1947 | Van Horne | 40—31 |
| 3,362,094 | 1/1968 | Mellander | 40—31 |
| 3,426,461 | 2/1969 | Miller | 40—31 |

EUGENE R. CAPOZIO, Primary Examiner

R. CARTER, Assistant Examiner

U.S. Cl. X.R.

40—31